United States Patent
Choi et al.

(10) Patent No.: US 12,456,774 B2
(45) Date of Patent: Oct. 28, 2025

(54) BATTERY PACK, ENERGY STORAGE SYSTEM, AND VEHICLE

(71) Applicant: LG ENERGY SOLUTION, LTD., Seoul (KR)

(72) Inventors: Sung-Man Choi, Daejeon (KR); Yong-Shik Shin, Daejeon (KR); Young-Jin Kim, Daejeon (KR); Do-Wung Son, Daejeon (KR); Seung-Hyun Yun, Daejeon (KR); Byeong-Yoon Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 626 days.

(21) Appl. No.: 17/791,556

(22) PCT Filed: Nov. 16, 2021

(86) PCT No.: PCT/KR2021/016811
§ 371 (c)(1),
(2) Date: Jul. 8, 2022

(87) PCT Pub. No.: WO2022/119182
PCT Pub. Date: Jun. 9, 2022

(65) Prior Publication Data
US 2023/0042717 A1    Feb. 9, 2023

(30) Foreign Application Priority Data
Dec. 3, 2020    (KR) .................. 10-2020-0167834

(51) Int. Cl.
*H01M 50/242*    (2021.01)
*H01M 50/238*    (2021.01)
(Continued)

(52) U.S. Cl.
CPC ....... *H01M 50/242* (2021.01); *H01M 50/238* (2021.01); *H01M 50/244* (2021.01); *H01M 50/249* (2021.01); *H01M 2220/20* (2013.01)

(58) Field of Classification Search
None
See application file for complete search history.

(56) References Cited

U.S. PATENT DOCUMENTS 5,552,958 A    9/1996  Seto et al.
5,849,122 A  * 12/1998  Kenmochi .......... B60R 13/0815
                                              296/191

(Continued)

FOREIGN PATENT DOCUMENTS

CN    106098992 A    11/2016
CN    109823154 A     5/2019
(Continued)

OTHER PUBLICATIONS

International Search Report for PCT/KR2021/016811 mailed on Feb. 24, 2022.
(Continued)

*Primary Examiner* — Gregg Cantelmo
(74) *Attorney, Agent, or Firm* — Birch, Stewart, Kolasch & Birch, LLP (57) ABSTRACT

A battery pack has improved safety against external impacts, and an energy storage system and a vehicle including the same. The battery pack includes a battery module having at least one battery cell; a tray having a plate shape so that the battery module is mounted thereon; a reinforcing member having a plate shape and mounted on the tray, the reinforcing member having at least a portion coupled to the tray and the other portion supporting the battery module upward, the reinforcing member being configured to form a space separated from the tray below the other portion supporting the battery module; and an elastic member constrained in the (Continued)

separated space in an elastically deformed state and configured to press a lower surface of the reinforcing member upward.

15 Claims, 6 Drawing Sheets

(51) Int. Cl.
  *H01M 50/244* (2021.01)
  *H01M 50/249* (2021.01)

(56) References Cited

U.S. PATENT DOCUMENTS

| | | | |
|---|---|---|---|
| 6,040,080 A * | 3/2000 | Minami | H01M 50/202 |
| | | | 429/96 |
| 10,734,619 B2 | 8/2020 | Nakano et al. | |
| 2009/0325049 A1 | 12/2009 | Niedzwiecki et al. | |
| 2011/0262799 A1 | 10/2011 | Kim | |
| 2013/0189557 A1 * | 7/2013 | Haussmann | H01M 10/6569 |
| | | | 165/104.11 |
| 2014/0014428 A1 | 1/2014 | Yanagi | |
| 2015/0249240 A1 * | 9/2015 | Hihara | H01M 8/2475 |
| | | | 180/68.5 |
| 2017/0066313 A1 | 3/2017 | Shirai et al. | |
| 2019/0337402 A1 * | 11/2019 | Günther | B60L 50/66 |
| 2020/0161729 A1 | 5/2020 | Kim et al. | |
| 2021/0083348 A1 | 3/2021 | Akasawa | |

FOREIGN PATENT DOCUMENTS

| | | |
|---|---|---|
| CN | 210805843 U | 6/2020 |
| EP | 3 739-656 A1 | 11/2020 |
| JP | 6-89126 A | 3/1994 |
| JP | 2008-251352 A | 10/2008 |
| JP | 2014-19203 A | 2/2014 |
| JP | 2016-100291 A | 5/2016 |
| JP | WO2017/146174 A1 | 3/2018 |
| JP | 2020-53132 A | 4/2020 |
| JP | 2020-149934 A | 9/2020 |
| KR | 10-2010-0003138 A | 1/2010 |
| KR | 10-2011-0117585 A1 | 10/2011 |
| KR | 10-2015-0076398 A | 7/2015 |
| KR | 10-2016-0087999 A | 7/2016 |
| KR | 10-2018-0133728 A | 12/2018 |
| KR | 10-2019-0129255 A | 11/2019 |
| WO | WO 2020/133660 A1 | 7/2020 |

OTHER PUBLICATIONS

Extended European Search Report for European Application No. 21900870.3, dated Jul. 24, 2023.

* cited by examiner

BATTERY PACK, ENERGY STORAGE SYSTEM, AND VEHICLE

TECHNICAL FIELD

The present disclosure relates to a battery pack, an energy storage system and a vehicle, and more particularly, to a battery pack with improved safety against external impacts, and an energy storage system and a vehicle including the same.

The present application claims the benefit of Korean Patent Application No. 10-2020-0167834 filed on Dec. 3, 2020, with the Korean Intellectual Property Office, the disclosure of which is incorporated herein by reference in its entirety.

BACKGROUND ART

Recently, with the rapid increase in demand for portable electronic products such as laptop computers, video cameras and mobile phones and the extensive development of electric vehicles, accumulators for energy storage, robots and satellites, many studies are being made on high performance secondary batteries that can be repeatedly recharged.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging can be done whenever it is convenient, the self-discharge rate is very low and the energy density is high.

A lithium secondary battery primarily uses a lithium-based oxide and a carbon material as a positive electrode active material and a negative electrode active material respectively. Additionally, the lithium secondary battery includes an electrode assembly including a positive electrode plate and a negative electrode plate coated with the positive electrode active material and the negative electrode active material respectively with a separator interposed between the positive electrode plate and the negative electrode plate, and a packaging or a battery case in which the electrode assembly is hermetically received together with an electrolyte solution.

Additionally, lithium secondary batteries may be classified into can-type secondary batteries including the electrode assembly embedded in a metal can and pouch-type secondary batteries including the electrode assembly embedded in a pouch of an aluminum laminate sheet according to the shape of the packaging.

In particular, the demand for large-capacity battery packs applied to electric vehicles or the like is increasing recently. In this way, when the vehicle collides with an external object, the impact may be transmitted to the large-capacity battery pack mounted in the vehicle. When such a large impact is applied to the battery pack, a plurality of battery modules may be damaged to cause short circuit with external components or short circuit with each other, which may result in an explosion module or a fire of the battery.

Therefore, technology that may safely protect the battery module mounted in the battery pack from external impacts is emerging as an important factor.

DISCLOSURE

Technical Problem

The present disclosure is designed to solve the problems of the related art, and therefore the present disclosure is directed to providing a battery pack with improved safety against external impacts, and an energy storage system and a vehicle including the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising:
- a battery module having at least one battery cell;
- a tray having a plate shape so that the battery module is mounted thereon;
- a reinforcing member mounted on the tray, the reinforcing member having at least one coupling portion coupled to the tray and at least one convex portion supporting the battery module upward, the reinforcing member being configured to form a first space between the tray and the at least one convex supporting the battery module; and
- an elastic member constrained in the first space in an elastically deformed state and configured to press a lower surface of the reinforcing member upward.

Also, the tray may include:
- at least one support portion configured to support a lower surface of the battery module upward and having a plate shape extending in a horizontal direction; and
- a damper portion partially concavely recessed downward relative to the at least one support portion to form a second space for accommodating the reinforcing member.

In addition, the damper portion may be configured to accommodate the elastic member, and
wherein an inner front surface and an inner rear surface of the damper portion may face a front end and a rear end of the elastic member, respectively.

Also, the elastic member may have a bar shape elongated to both sides so that both ends of the elastic member in an extending direction are curved upward or downward, and both ends of the elastic member may be compressed to be spread to both sides by an inner surface of the first space.

The at last one coupling may be configured to be coupled with the damper portion; and
the at least one convex portion may be configured to protrusively extend upward from the coupling portion, the at least one convex portion may have at least two rail portions protruding upward from a top surface of the at least one convex portion and extending in front and rear directions of the reinforcing member.

In addition, the battery pack may further comprise a mounting protrusion provided below the battery module and configured to protrude downward so as to be inserted between the at least two rail portions.

Further, both ends of the elastic member curved upward may be inserted into lower portions of the at least two rail portions of the at least one convex portion, respectively.

Also, the battery pack may further comprise an auxiliary reinforcing member coupled to the tray and having at least a portion protruding upward to have a convex shape.

In addition, in another aspect of the present disclosure, there is also provide an energy storage system, comprising at least one battery pack as above.

Further, in another aspect of the present disclosure, there is also provide a vehicle, comprising at least one battery pack as above.

The at least one support portion may be two support portions, and the damper portion may be between the two support portions.

At least one auxiliary reinforcing member may be coupled to the tray.

The at least one convex portion may be two convex portions, and the at least one coupling portion may be between the two convex portions.

Advantageous Effects

According to an embodiment of the present disclosure, since the elastic member is constrained in an elastically deformed state in the separated space and configured to press the lower surface of the reinforcing member upward, it is possible to increase the defense of the reinforcing member against external impacts and increase the durability of the reinforcing member. That is, when compared with the case where the load of the battery module mounted on the upper portion of the reinforcing member is supported by the reinforcing member alone, in the present disclosure, the pressing force of pressing the reinforcing member upward using the elastically-deformed elastic member offsets the load of the battery module, so it is possible to prevent the reinforcing member from being pressed downward with an excessive force to be permanently deformed.

Moreover, if the elastic member is not provided, in an environment where frequent vibration or vertical shock is frequent like a vehicle, the magnitude of the force that the battery module presses the reinforcing member downward is large and the reinforcing member is frequently pressed, the reinforcing member mounted to the tray may be deformed in a short period of time. However, in the present disclosure, since the elastically-deformed elastic member presses the reinforcing member upward, the battery module may offset the load. Further, since the elastic member elastically presses the reinforcing member, even when the battery module momentarily presses the reinforcing member downward, it is possible to effectively buffer the pressing force. Accordingly, in the present disclosure, it is possible to prevent the reinforcing member from being permanently deformed or damaged, thereby increasing the durability of the reinforcing member.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
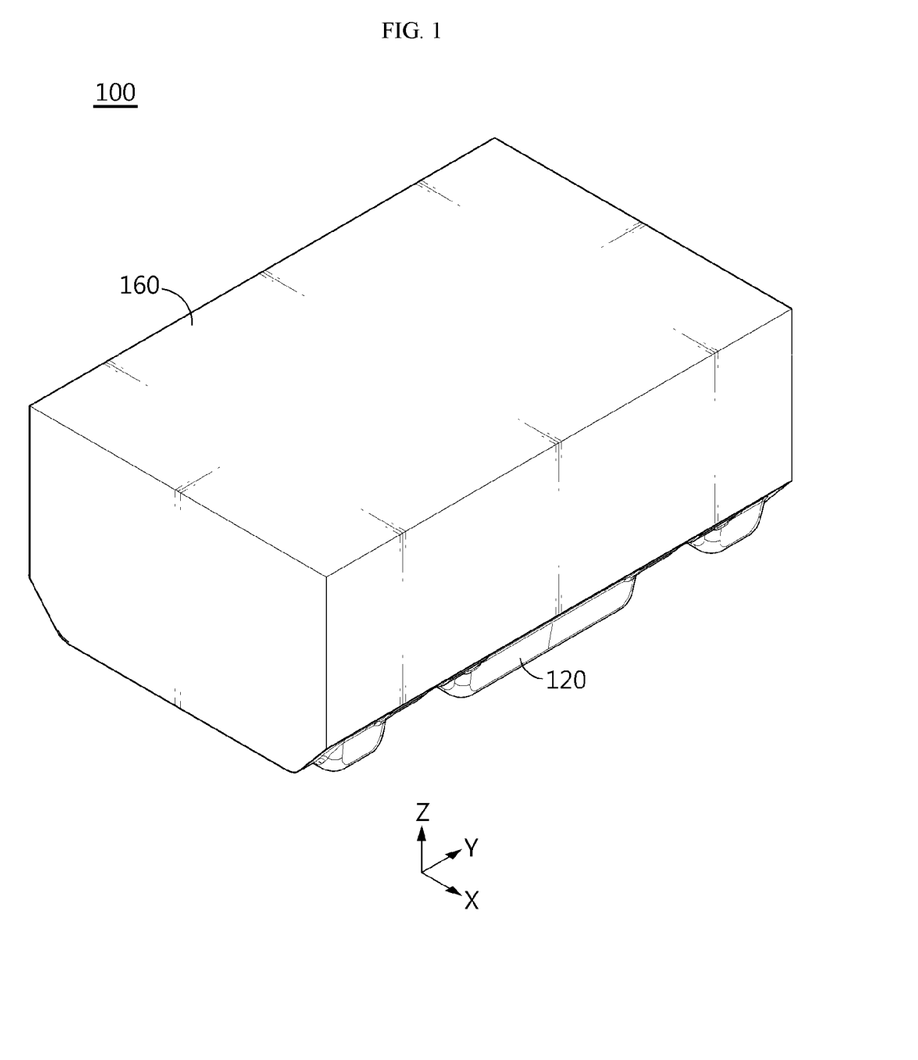
FIG. 1 is a perspective view schematically showing a battery pack according to an embodiment of the present disclosure.
Figure 2:
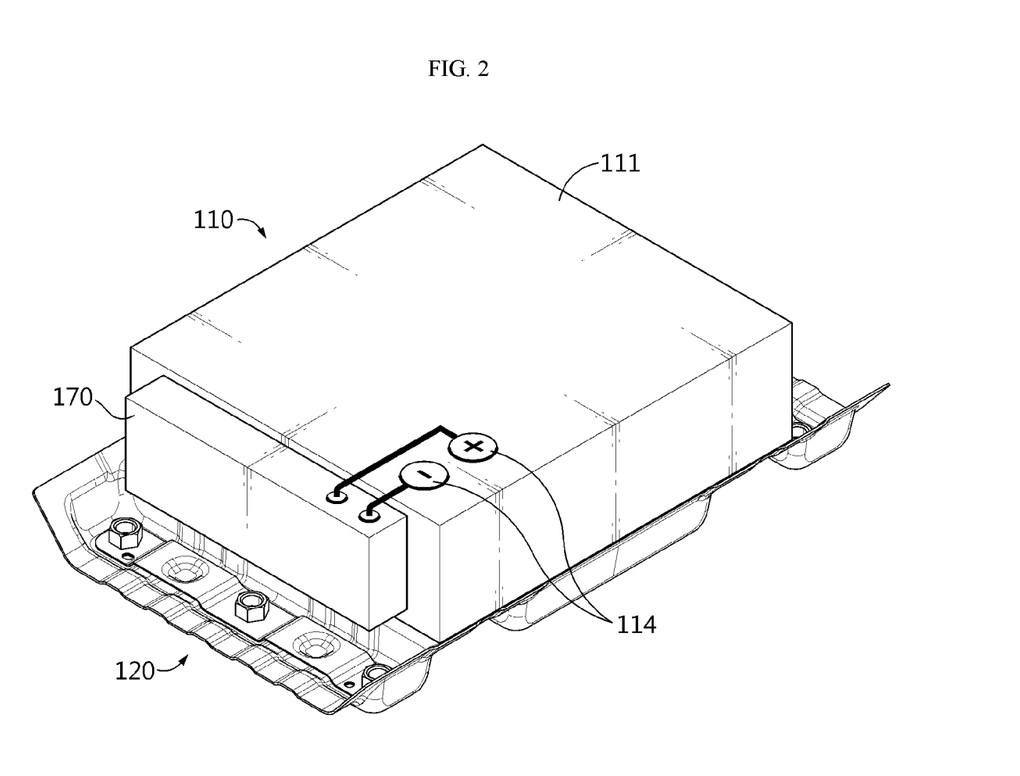
FIG. 2 is a perspective view schematically showing some components of the battery pack according to an embodiment of the present disclosure.
Figure 3:
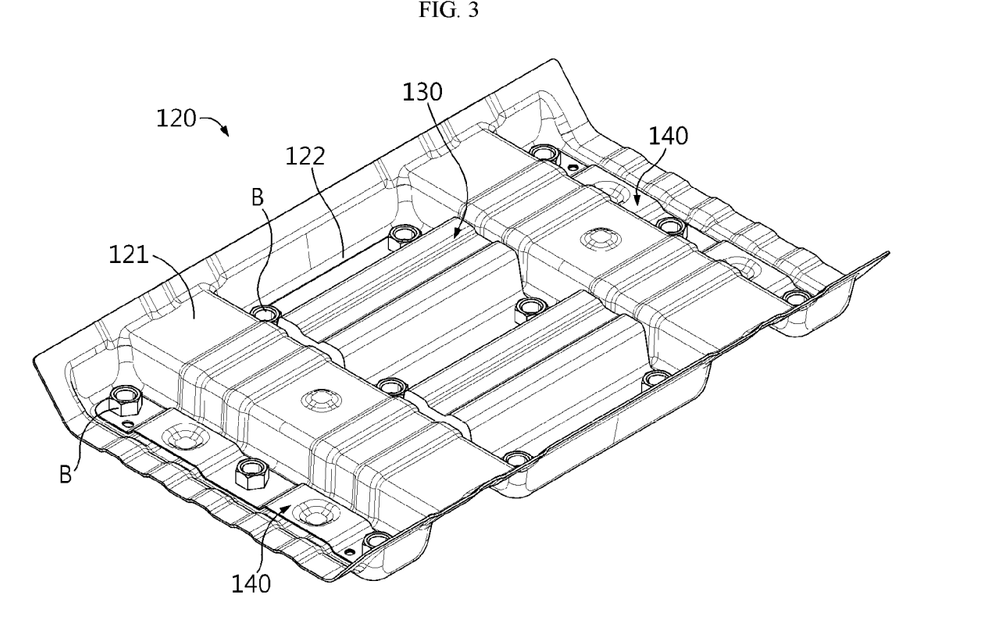
FIG. 3 is a perspective view schematically showing some components of the battery pack according to an embodiment of the present disclosure.
Figure 4:
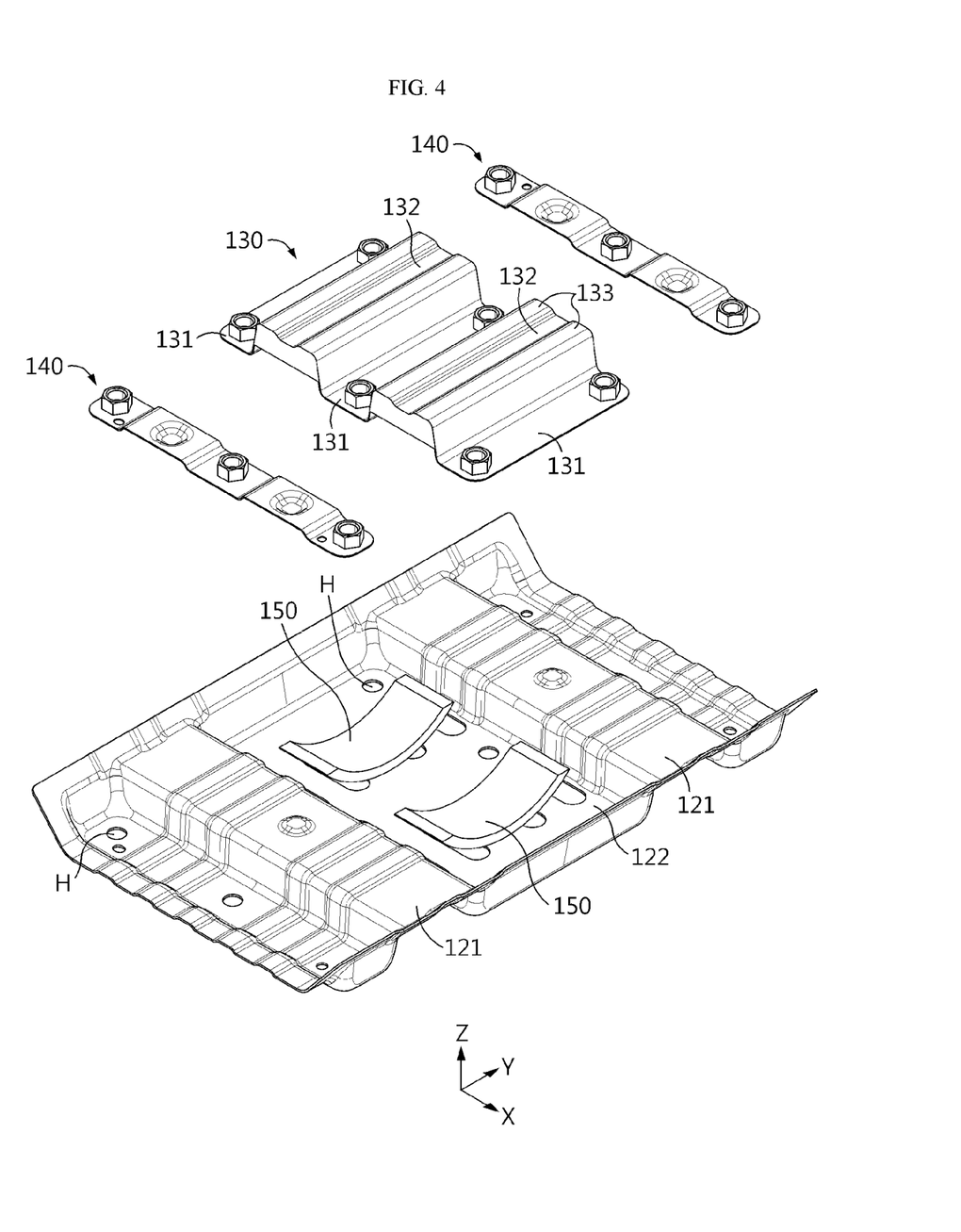
FIG. 4 is an exploded perspective view schematically showing some components of the battery pack according to an embodiment of the present disclosure.
Figure 5:
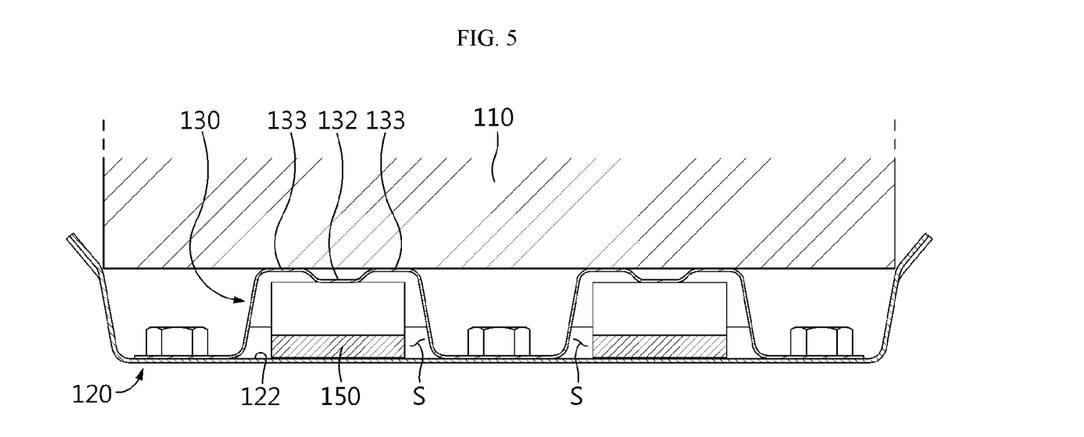
FIG. 5 is a vertical sectional view schematically showing the inner configuration of the battery pack according to an embodiment of the present disclosure.

FIG. 1 is a perspective view schematically showing a battery pack according to an embodiment of the present disclosure. FIG. 2 is a perspective view schematically showing some components of the battery pack according to an embodiment of the present disclosure. FIG. 3 is a perspective view schematically showing some components of the battery pack according to an embodiment of the present disclosure. FIG. 4 is an exploded perspective view schematically showing some components of the battery pack according to an embodiment of the present disclosure. Also, FIG. 5 is a vertical sectional view schematically showing the inner configuration of the battery pack according to an embodiment of the present disclosure. For reference, in the present disclosure, the X-axis direction shown in FIG. 1 is set to the left and right direction, the Y-axis direction is set to the front and rear directions, and the Z-axis direction is set to the upper and lower directions.

Referring to FIGS. 1 to 5, a battery pack 100 according to an embodiment of the present disclosure includes a battery module 110, a tray 120, a reinforcing member 130, and an elastic member 150.

Specifically, the battery module 110 includes at least one battery cell. The battery module 110 may include a plurality of battery cells (not shown), and a module housing 111 for accommodating the plurality of battery cells therein. The battery cell may be a lithium secondary battery. The battery cell may be a pouch-type battery cell including an electrode assembly (not shown), an electrolyte (not shown), and a pouch for accommodating them therein. However, the battery pack 100 according to the present disclosure is not limited to the aforementioned pouch-type battery cell and, for example, the battery cell may be a cylindrical battery cell. That is, various battery cells known at the time of filing of this application may be employed as the battery cell.

The battery module 110 may include at least one bus bar (not shown) configured to electrically connect the plurality of battery cells to each other therein. Specifically, the bus bar may have a conductive metal, for example copper, aluminum, nickel, or the like.

In addition, the module housing 111 may have an electrically insulating material. For example, the module housing 111 may be made of polyvinyl chloride material. The module housing 111 may have a space to accommodate the plurality of battery cells therein. The module housing 111 may have a rectangular parallelepiped box shape as a whole.

In addition, the battery module 110 may include external terminals. The external terminals 114 may be an external positive electrode terminal and an external negative electrode terminal depending on electrical polarity.

Moreover, the tray 120 may be configured so that the battery module 110 is mounted thereon. The tray 120 may have a plate shape extending approximately in a horizontal direction. The tray 120 may have a wider upper surface than the lower surface of the battery module 110. The tray 120 may include, for example, a steel material having excellent mechanical rigidity, or a stainless steel material.

In addition, the reinforcing member 130 may have a plate shape extending in the horizontal direction. The reinforcing member 130 may be mounted on the tray 120. At least a portion of the reinforcing member 130 may be bolted to the tray 120. The reinforcing member 130 may be configured such that the other portion thereof, which is not coupled, supports the battery module 110 upward. A space S separated from the tray 120 may be formed below the other portion supporting the battery module 110 of the reinforcing member 130. That is, the other portion of the reinforcing member 130 may be formed to be spaced apart from the upper surface of the tray 120 by a predetermined distance. The reinforcing member 130 may increase the mechanical rigidity of the tray 120 by being coupled with the tray 120.

For example, if an external object collides with the front, rear or side surfaces of the battery pack 100, the reinforcing member 130 may absorb the impact force or block the impact together with the tray 120. Accordingly, it is possible to protect the tray 120 and the battery module 110 mounted to the reinforcing member 130 from the external impacts. The reinforcing member 130 may include, for example, a steel material having excellent mechanical rigidity, or a stainless steel material.

In addition, the battery pack 100 of the present disclosure may further include an auxiliary reinforcing member 140. The auxiliary reinforcing member 140 may be configured to be coupled with the tray 120. For example, a bolt hole H configured so that a bolt B is inserted therein may be formed in each of the auxiliary reinforcing member 140 and the tray 120. That is, the auxiliary reinforcing member 140 may be bolted to the tray 120. The auxiliary reinforcing member 140 may have at least a portion of a convex shape protruding upward. For example, as shown in FIG. 3, the battery pack 100 of the present disclosure may include two auxiliary reinforcing members 140. Each of the two auxiliary reinforcing members 140 may be coupled to the front end and the rear end part of the tray 120, respectively. The auxiliary reinforcing member 140 may have two convex shapes protruding upward.

Therefore, according to this configuration of the present disclosure, in the present disclosure, since the auxiliary reinforcing member 140 is further provided, it is possible to effectively increase the mechanical rigidity of the tray 120. That is, when a vehicle collision occurs, if an external object applies an impact to the battery pack 100, the tray 120, the reinforcing member 130 and the auxiliary reinforcing member 140 may withstand the external impact to minimize deformation of the tray 120. Accordingly, in the present disclosure, it is possible to protect the battery module mounted to the tray 120 from a collision accident, thereby greatly improving safety.

Figure 6:
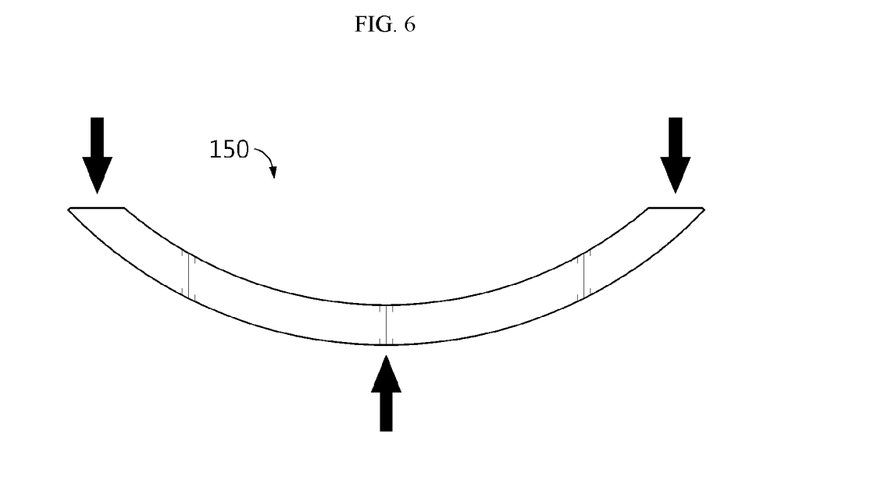
FIG. 6 is a side view schematically showing that an elastic member of the battery pack according to an embodiment of the present disclosure is compressed.

FIG. 6 is a side view schematically showing that an elastic member of the battery pack according to an embodiment of the present disclosure is compressed.

Referring to FIG. 6 along with FIGS. 1 to 5, the elastic member 150 may be constrained in the separated space S in an elastically deformed state. For example, as shown in FIG. 4, two elastic members 150 may be provided. The elastic member 150 may be, for example, a leaf spring. The elastic member 150 may be configured to press the lower surface of the reinforcing member 130 upward. For example, both ends of the elastic member 150 in a state of being accommodated in the separated space S may press the lower surface of the other portion of the reinforcing member upward. For example, as shown in FIG. 6, the elastic member 150 may be accommodated in the separated space S in a compressed state with a predetermined force between the tray 120 and the reinforcing member 130.

Therefore, according to this configuration of the present disclosure, in the present disclosure, since the elastic member 150 is constrained in an elastically deformed state in the separated space S and configured to press the lower surface of the reinforcing member 130 upward, it is possible to increase the defense of the reinforcing member 130 against external impacts and increase the durability of the reinforcing member 130. That is, when compared with the case where the load of the battery module 110 mounted on the upper portion of the reinforcing member 130 is supported by the reinforcing member 130 alone, in the present disclosure, the pressing force of pressing the reinforcing member 130 upward using the elastically-deformed elastic member 150 offsets the load of the battery module 110, so it is possible to prevent the reinforcing member 130 from being pressed downward with an excessive force to be permanently deformed.

Moreover, if the elastic member 150 is not provided, in an environment where frequent vibration or vertical shock is frequent like a vehicle, the magnitude of the force that the battery module 110 presses the reinforcing member 130 downward is large and the reinforcing member 130 is frequently pressed, the reinforcing member 130 mounted to the tray 120 may be deformed in a short period of time. However, in the present disclosure, since the elastically-deformed elastic member 150 presses the reinforcing member 130 upward, the battery module 110 may offset the load. Further, since the elastic member 150 elastically presses the reinforcing member 130, even when the battery module 110 momentarily presses the reinforcing member 130 downward, it is possible to effectively buffer the pressing force. Accordingly, in the present disclosure, it is possible to prevent the reinforcing member 130 from being permanently deformed or damaged, thereby increasing the durability of the reinforcing member 130.

Meanwhile, referring to FIG. 3 again, the tray 120 may include a support portion 121 and a damper portion 122. The support portion 121 may be configured to support a lower surface of the battery module 110 upward. That is, the support portion 121 may be configured to face the lower surface of the battery module 110. The support portion 121 may have a plate shape extending in a horizontal direction. The support portion 121 may have a line-shaped protrusion through beading upward. The string-like protrusion may increase the mechanical rigidity of the support portion 121.

In addition, the damper portion 122 may be a portion of the tray 120 that is partially recessed downward further to the support portion 121 to form a space capable of accommodating the reinforcing member 130. That is, the damper portion 122 may be a portion convexly protruding downward further to the support portion 121. When the battery pack 100 is mounted to a chassis of a vehicle, the damper portion 122 may be supported by a part of the chassis of the vehicle. For example, the tray 120 may have a damper portion 122 in the center thereof. The tray 120 may include a support portion 121 at the front and rear sides of the damper portion 122, respectively.

Therefore, according to this configuration of the present disclosure, in the present disclosure, since the tray 120 includes the support portion 121 and the damper portion 122, in a state where the support portion 121 stably supports the battery module 110, the damper portion 122 protruding downward may effectively buffer the load of the battery module 110.

In addition, the damper portion 122 may be configured to accommodate the elastic member 150 in a concavely recessed space. The inner front surface, the inner rear surface, the inner left surface and the inner right surface of the concavely recessed space of the damper portion 122 may constrain the elastic member 150 so that the elastic member 150 is not deviated to the outside.

Therefore, according to this configuration of the present disclosure, in the present disclosure, since the concavely recessed space configured to accommodate the elastic member 150 is formed in the damper portion 122, it is possible to accommodate the elastic member 150 stably. Moreover, even if the elastic member 150 is decomposed into a small size by external impacts, it is possible to prevent the elastic member 150 from leaking out by the recessed space of the damper portion 122. Accordingly, in the present disclosure, it is possible to prevent fragments of the elastic member 150 leaking out of the tray 120 from damaging components inside the vehicle. Accordingly, in the present disclosure, it is possible to increase safety against a vehicle collision accident.

Also, the elastic member 150 may have a bar shape elongated to both sides. The elastic member 150 may have a shape in which both ends thereof in the extending direction are curved upward or downward. For example, as shown in FIG. 4, the elastic member 150 may have a bar shape elongated in front and rear directions (Y-axis direction). Both ends of the elastic member 150 may be curved upward. Both ends of the elastic member 150 may press the lower surface of the pressing member upward (Z-axis direction). In addition, both ends of the elastic member 150 may be compressed to spread to both sides by the inner surface of the separated space S. In other words, the lower surface of the reinforcing member 130 may press the upper portion of the elastic member 150 downward, and the upper surface of the damper portion 122 of the tray 120 may press the lower portion of the elastic member 150 upward. Accordingly, the elastic member 150 may be accommodated in the separated space S between the tray 120 and the reinforcing member 130 with both ends thereof spreading out in front and rear directions.

In addition, as in FIG. 5, the reinforcing member 130 may include a coupling portion 131 and a convex portion 132. The coupling portion 131 may be configured to be coupled with the damper portion 122. The coupling portion 131 may have a plate shape to face the damper portion 122. The coupling portion 131 may be bolted to the damper portion 122 using a bolt B, a nut, or the like. The coupling portion 131 and the damper portion 122 may have a bolt hole H configured so that the bolt B is inserted therein.

Moreover, the convex portion 132 may be a portion that protrudes upward from the coupling portion 131 of the reinforcing member 130. The convex portion 132 may have a portion bent upward from the coupling portion 131, a portion bent in a horizontal direction from an end of the portion bent upward, and a portion bent downward from an end of the portion bent in the horizontal direction. For example, as shown in FIG. 4, the reinforcing member 130 may include three coupling portions 131 and two convex portions 132.

In addition, the convex portion 132 may include at least two rail portions 133. The rail portion 133 may have a shape that protrudes upward further to the remaining portion. The rail portion 133 may extend in front and rear directions. The rail portion 133 may have a protrusion shape extending in the front and rear directions through beading and protruding upward.

Therefore, according to this configuration of the present disclosure, in the present disclosure, since the coupling portion 131, the convex portion 132 and the rail portion 133 are included, a plurality of bent structures are provided, so the mechanical rigidity of the reinforcing member 130 may be improved effectively.

Figure 7:
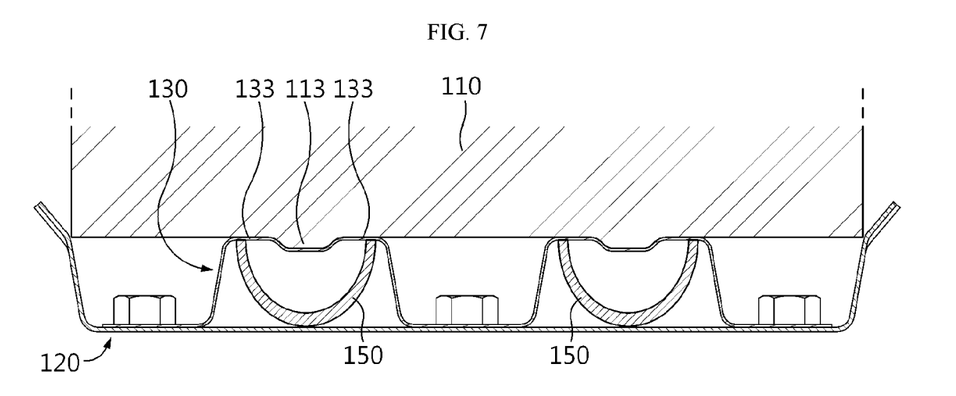
FIG. 7 is a vertical sectional view schematically showing the inner configuration of the battery pack according to another embodiment of the present disclosure.

FIG. 7 is a vertical sectional view schematically showing the inner configuration of the battery pack according to another embodiment of the present disclosure.

Referring to FIG. 7, the battery module 110 of the battery pack 100 according to another embodiment of the present disclosure may include a mounting protrusion 113 protruding downward. The mounting protrusion 113 is inserted between the at least two rail portions 133 and may guide the battery module 110 to be properly positioned on the reinforcing member 130. For example, as shown in FIG. 7, two mounting protrusions 113 may be provided on the lower surface of the battery module 110. Each of the two mounting protrusions 113 can be inserted between the two rail portions 133 provided to the convex portion 132.

Therefore, according to this configuration of the present disclosure, since the battery module 110 having a mounting protrusion 113 inserted between at least two rail portions 133 is provided, the contact area between the battery module 110 and the reinforcing member 130 may be effectively increased. Accordingly, the load of the battery module 110 may be more uniformly distributed to the reinforcing member 130, which is helpful for alleviating the impact caused by the load of the battery module 110. In addition, the heat generated from the battery module 110 may be conducted through the extended contact surface of the reinforcing member 130 and discharged to the outside, so that the cooling efficiency of the battery module 110 may also be increased.

Meanwhile, referring to FIG. 7 again, the battery pack 100 according to another embodiment of the present disclosure may have a shape elongated in the left and right directions, unlike the elastic member 150 of FIG. 4 having a shape elongated in the front and rear directions. Other components may be the same as those of FIG. 4.

In addition, both ends of the elastic member 150 of FIG. 7 curved upward may be inserted into the lower portion of the at least two rail portions 133 of the reinforcing member 130, respectively. For example, as shown in FIG. 7, two elastic members 150 may be provided to the lower portion of the reinforcing member 130. The two elastic members 150 may be disposed in a form elongated in the left and right directions (X-axis direction), respectively. Both ends of each of the two elastic members 150 may have a shape curved upward. Each of both ends of the elastic member 150 may be inserted under the at least two rail portions 133. That is, both ends of the elastic member 150 may press the lower surface of the rail portion 133 of the reinforcing member 130 upward.

Therefore, according to this configuration of the present disclosure, in the present disclosure, since the elastic member 150 directly upwardly presses the lower surface of the rail portion 133 supporting the battery module 110 upward, in the upper direction, the load may be buffered more effectively. That is, when compared with the elastic member 150 of FIG. 5, since the elastic member 150 of FIG. 5 supports the lower surface of the convex portion 132, rather than the rail portion 133 of the reinforcing member 130, the load of the battery module 110 is transferred to the convex portion 132 first, and then the load transferred to the convex portion 132 is transferred to the elastic member 150 secondarily. Meanwhile, the elastic member 150 of FIG. 7 presses the lower surface of the rail portion 133 directly supporting the battery module 110 upward, so that the load of the battery module 110 may press the rail portion 133 downward and at the same time the elastic member 150 may absorb the load of the battery module 110 directly, thereby effectively increasing the effect of buffering vibration and external impacts of the battery pack 100.

Meanwhile, referring to FIGS. 1 to 3 again, the battery pack 100 may further include a BMS (Battery Management System) 170. The BMS may be mounted on the tray 120. In addition, the battery pack 100 may include an upper cover 160 configured to cover an upper portion and a side portion of the battery module 110. An end of the upper cover 160 extending downward may be coupled with an outer periphery of the tray 120 120. For example, the lower end of the upper cover 160 may be welded to the outer periphery of the tray 120.

Meanwhile, an energy storage system (not shown) according to an embodiment of the present disclosure includes at least one battery pack 100 as above. The energy storage system may charge the battery pack 100 by receiving power from an external power plant. When external power is required, the energy storage system may discharge the battery pack 100 to supply the power stored in the battery pack 100 to the outside. The energy storage system may include a central control unit configured to control charging and discharging of the battery pack 100.

Meanwhile, a vehicle (not shown) according to an embodiment of the present disclosure may include at least one battery module 110 as above and a vehicle body having an accommodation space for accommodating the battery module 110. For example, the vehicle may be an electric vehicle, an electric scooter, an electric wheelchair, an electric bike, or the like.

Meanwhile, the terms indicating directions as used herein such as upper, lower, left, right, front and rear are used for convenience of description only, and it is obvious to those skilled in the art that the term may change depending on the position of the stated element or an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
|---|---|
| 100: battery pack | 110: battery module |
| 111: module housing | |
| 120: tray | 121, 122: support portion, damper portion |
| 130: reinforcing member | 140: auxiliary reinforcing member |
| 131, 132, 133: coupling portion, convex portion, rail portion | |
| 150: elastic member | H: bolt hole |
| 113: mounting protrusion | S: separated space |
| 160: upper cover | 170: BMS |

What is claimed is:

1. A battery pack, comprising:

a battery module having at least one battery cell;

a tray having a plate shape so that the battery module is mounted thereon;

a reinforcing member mounted on the tray, the reinforcing member having at least one coupling portion coupled to the tray and at least one convex portion having an upwardly facing convex surface supporting the battery module upward, a first space formed between the tray and the at least one convex portion supporting the battery module; and an elastic member constrained in the first space in an elastically deformed state and configured to press a lower surface of the reinforcing member upward, wherein the at least one convex portion is connected to and integrally formed with the at least one coupling portion, wherein the at least one convex portion has a first portion bent upward from the coupling portion, a second portion bent in a horizontal direction from an end of the first portion, and a third portion bent downward from an end of the second portion bent, and wherein both ends of the elastic member press a lower surface of the reinforcing member upward.

2. A battery pack, comprising:

a battery module having at least one battery cell;

a tray having a plate shape so that the battery module is mounted thereon;

a reinforcing member mounted on the tray, the reinforcing member having at least one coupling portion coupled to the tray and at least one convex portion supporting the battery module upward, the reinforcing member being configured to form a first space between the tray and the at least one convex portion supporting the battery module; and an elastic member constrained in the first space in an elastically deformed state and configured to press a lower surface of the reinforcing member upward, wherein the tray includes:

at least one support portion configured to support a lower surface of the battery module upward and having a plate shape extending in a horizontal direction; and a damper portion partially concavely recessed downward relative to the at least one support portion to form a second space for accommodating the reinforcing member.

3. The battery pack according to claim 2, wherein the damper portion is configured to accommodate the elastic member, and wherein an inner front surface and an inner rear surface of the damper portion face a front end and a rear end of the elastic member, respectively.

4. The battery pack according to claim 2, wherein the elastic member has a bar shape elongated to both sides so that both ends of the elastic member in an extending direction are curved upward or downward, and both ends of the elastic member are compressed to be spread to both sides by an inner surface of the first space.

5. The battery pack according to claim 4, wherein the at least one coupling portion is configured to be coupled with the damper portion, wherein the at least one convex portion is configured to protrusively extend upward from the at least one coupling portion, and wherein the at least one convex portion has at least two rail portions protruding upward from a top surface of the at least one convex portion and extending in front and rear directions of the reinforcing member.

6. The battery pack according to claim 5, further comprising:

a mounting protrusion provided below the battery module and configured to protrude downward so as to be inserted between the at least two rail portions.

7. The battery pack according to claim 5, wherein both ends of the elastic member curved upward are inserted into lower portions of the at least two rail portions of the at least one convex portion, respectively.

8. The battery pack according to claim 1, further comprising:

an auxiliary reinforcing member coupled to the tray and having at least a portion protruding upward to have a convex shape.

9. An energy storage system, comprising at least one battery pack according to claim 1.

10. A vehicle, comprising at least one battery pack according to claim 1.

11. The battery pack according to claim 2, wherein the at least one support portion is two support portions, and wherein the damper portion is between the two support portions.

12. The battery pack according to claim 11, further comprising at least one auxiliary reinforcing member coupled to the tray.

13. The battery pack according to claim 1, wherein the at least one convex portion is two convex portions, and wherein the at least one coupling portion is between the two convex portions.

14. The battery pack according to claim 1, wherein the at least one coupling portion is a pair of coupling portions, each of the pair of coupling portions fixed to the tray, and wherein the at least one convex portion is between the pair of coupling portions.

15. The battery pack according to claim 1, wherein the at least one convex portion comprises a pair of side walls and a top wall, and wherein the top wall has a pair of rail portions and a central portion between the pair of rail portions.

* * * * *